(12) United States Patent
Shinozaki

(10) Patent No.: US 12,459,039 B2
(45) Date of Patent: Nov. 4, 2025

(54) AM APPARATUS FOR MANUFACTURING A FABRICATED OBJECT AND METHOD FOR TESTING AN IRRADIATION POSITION OF A BEAM IN THE AM APPARATUS

(71) Applicant: EBARA CORPORATION, Tokyo (JP)

(72) Inventor: Hiroyuki Shinozaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 1018 days.

(21) Appl. No.: 17/610,877

(22) PCT Filed: Mar. 19, 2020

(86) PCT No.: PCT/JP2020/012181
§ 371 (c)(1),
(2) Date: Nov. 12, 2021

(87) PCT Pub. No.: WO2020/235204
PCT Pub. Date: Nov. 26, 2020

(65) Prior Publication Data
US 2022/0212261 A1    Jul. 7, 2022

(30) Foreign Application Priority Data

May 21, 2019   (JP) .................................. 2019-095153

(51) Int. Cl.
*B22F 10/80*   (2021.01)
*B22F 12/41*   (2021.01)
(Continued)

(52) U.S. Cl.
CPC .............. *B22F 10/80* (2021.01); *B22F 12/41* (2021.01); *B23K 26/042* (2015.10);
(Continued)

(58) Field of Classification Search
CPC .......... B22F 10/28; B22F 10/31; B22F 10/32; B22F 10/36; B22F 10/366; B22F 10/77;
(Continued)

(56) References Cited

U.S. PATENT DOCUMENTS 5,832,415 A    11/1998   Wilkening et al.
2015/0071809 A1*   3/2015   Nordkvist .......... B23K 15/0086
219/76.14
(Continued)

FOREIGN PATENT DOCUMENTS

CN   106584855 A   4/2017
JP   2016-060131 A   4/2016
(Continued)

OTHER PUBLICATIONS

Extended European search report issued in European Patent Application No. 20808750.2 dated Jun. 2, 2023.
(Continued)

*Primary Examiner* — Vy T Nguyen
(74) *Attorney, Agent, or Firm* — Chrisman Gallo Tochtrop LLC

(57) ABSTRACT

The present application provides a technique for testing execution data and an operation of an AM apparatus by bringing the AM apparatus into operation before actually carrying out fabrication. An AM apparatus configured to manufacture a fabricated object is provided. This AM apparatus includes a chamber defining a space used to manufacture the fabricated object, a base plate disposed in the chamber and configured to support a material of the fabricated object, a beam source configured to irradiate the material on the base plate with a beam, a computer configured to determine an irradiation position of the beam based on three-dimensional data of the fabricated object, a scanning mechanism configured to move the beam according to (Continued)

the determined irradiation position, a detector configured to detect an irradiation position of the beam applied into the chamber, and an evaluator configured to compare the determined irradiation position and the detected irradiation position.

3 Claims, 5 Drawing Sheets

(51) Int. Cl.
    *B23K 26/042*     (2014.01)
    *B23K 26/06*     (2014.01)
    *B33Y 10/00*     (2015.01)
    *B33Y 30/00*     (2015.01)
    *B33Y 50/00*     (2015.01)

(52) U.S. Cl.
    CPC .......... *B23K 26/0626* (2013.01); *B33Y 10/00* (2014.12); *B33Y 30/00* (2014.12); *B33Y 50/00* (2014.12)

(58) Field of Classification Search
    CPC .......... B22F 12/41; B22F 12/44; B22F 12/45; B22F 12/90; B22F 2203/03; B22F 2203/11; B22F 2999/00; B23K 26/032; B23K 26/0604; B23K 26/0608; B23K 26/062; B23K 26/125; B23K 26/127; B23K 26/34; B23K 26/342; B23K 26/354; B23K 26/703; B28B 1/001; B28B 17/0081; B29C 64/135; B29C 64/153; B29C 64/268; B29C 64/35; B29C 64/393
    USPC ..................................................... 219/76.14
See application file for complete search history.

(56) References Cited

U.S. PATENT DOCUMENTS

| | | |
|---|---|---|
| 2017/0100895 A1 | 4/2017 | Chou et al. |
| 2018/0281067 A1 | 10/2018 | Small et al. |
| 2018/0345582 A1 | 12/2018 | Schade |
| 2020/0023585 A1* | 1/2020 | Wiesner .................. B29C 64/20 |
| 2024/0059020 A1* | 2/2024 | Milshtein ................ B22F 12/63 |

FOREIGN PATENT DOCUMENTS

| | | |
|---|---|---|
| JP | 2016-534234 A | 11/2016 |
| JP | 2017-077671 A | 4/2017 |

OTHER PUBLICATIONS

International Search Report dated Jun. 9, 2020 issued in Patent Application No. PCT/JP2020/012181.
Written Opinion dated Jun. 9, 2020 issued in Patent Application No. PCT/JP2020/012181.

* cited by examiner

AM APPARATUS FOR MANUFACTURING A FABRICATED OBJECT AND METHOD FOR TESTING AN IRRADIATION POSITION OF A BEAM IN THE AM APPARATUS

TECHNICAL FIELD

The present application relates to an AM apparatus for manufacturing a fabricated object and a method for testing an irradiation position of a beam in the AM apparatus. The present application claims priority under the Paris Convention to Japanese Patent Application No. 2019-095153 filed on May 21, 2019. The entire disclosure of Japanese Patent Application No. 2019-095153 including the specification, the claims, the drawings, and the abstract is incorporated herein by reference in its entirety.

BACKGROUND ART

There are known techniques for directly fabricating a three-dimensional object based on three-dimensional data on a computer that expresses the three-dimensional object. Known examples thereof include the Additive Manufacturing (AM) technique. As one example, in the AM technique using metal powder, each layer of the three-dimensional object is fabricated by, toward the metal powder deposited all over a surface, irradiating a portion thereof to be fabricated with a laser beam or an electron beam serving as a heat source, and melting and solidifying or sintering the metal powder. In the AM technique, a desired three-dimensional object can be fabricated by repeating such a process.

CITATION LIST

Patent Literature

PTL 1: Japanese Patent Domestic Announcement No. 2016-534234

PTL 2: Japanese Patent Application Public Disclosure No. 2017-77671

SUMMARY OF INVENTION

Technical Problem

In the AM technique, execution data such as an irradiation position and a beam track of the laser beam or the electron beam is generated layer by layer based on the three-dimensional CAD data that expresses the three-dimensional object targeted for the fabrication. The AM apparatus automatically carries out the additive manufacturing based on the execution data generated under computer control. Therefore, to test the execution data generated for the fabrication, the execution data is supposed to be confirmed by actually carrying out the fabrication. A simulation of the fabrication can be conducted in a virtual space on a computer, but the actual operation of the AM apparatus, the actual position irradiated with the beam, and the like cannot be tested without the AM apparatus actually put into operation.

If the AM apparatus malfunctions in the process of actually manufacturing the fabricated object or an error is contained in the generated execution data, this may lead to a failure to yield the fabricated object as intended or a stop of the AM apparatus in the middle of the fabrication. In this case, the fabrication is supposed to be retried after the error or the malfunction is solved, thereby wasting the material, time, and the like. Further, as the size of the manufactured fabricated object increases, the wastefulness increases when the fabrication is retried. Under these circumstances, one object of the present application is to provide a technique for testing the execution data and the operation of the AM apparatus by putting the AM apparatus into operation before actually carrying out the fabrication.

SOLUTION TO PROBLEM

According to one aspect, an AM apparatus configured to manufacture a fabricated object is provided. This AM apparatus includes a chamber defining a space used to manufacture the fabricated object, a base plate disposed in the chamber and configured to support a material of the fabricated object, a beam source configured to irradiate the material on the base plate with a beam, a computer configured to determine an irradiation position of the beam based on three-dimensional data of the fabricated object, a scanning mechanism configured to move the beam according to the determined irradiation position, a detector configured to detect an irradiation position of the beam applied into the chamber, and an evaluator configured to compare the determined irradiation position and the detected irradiation position.

DESCRIPTION OF EMBODIMENTS

Figure 1:
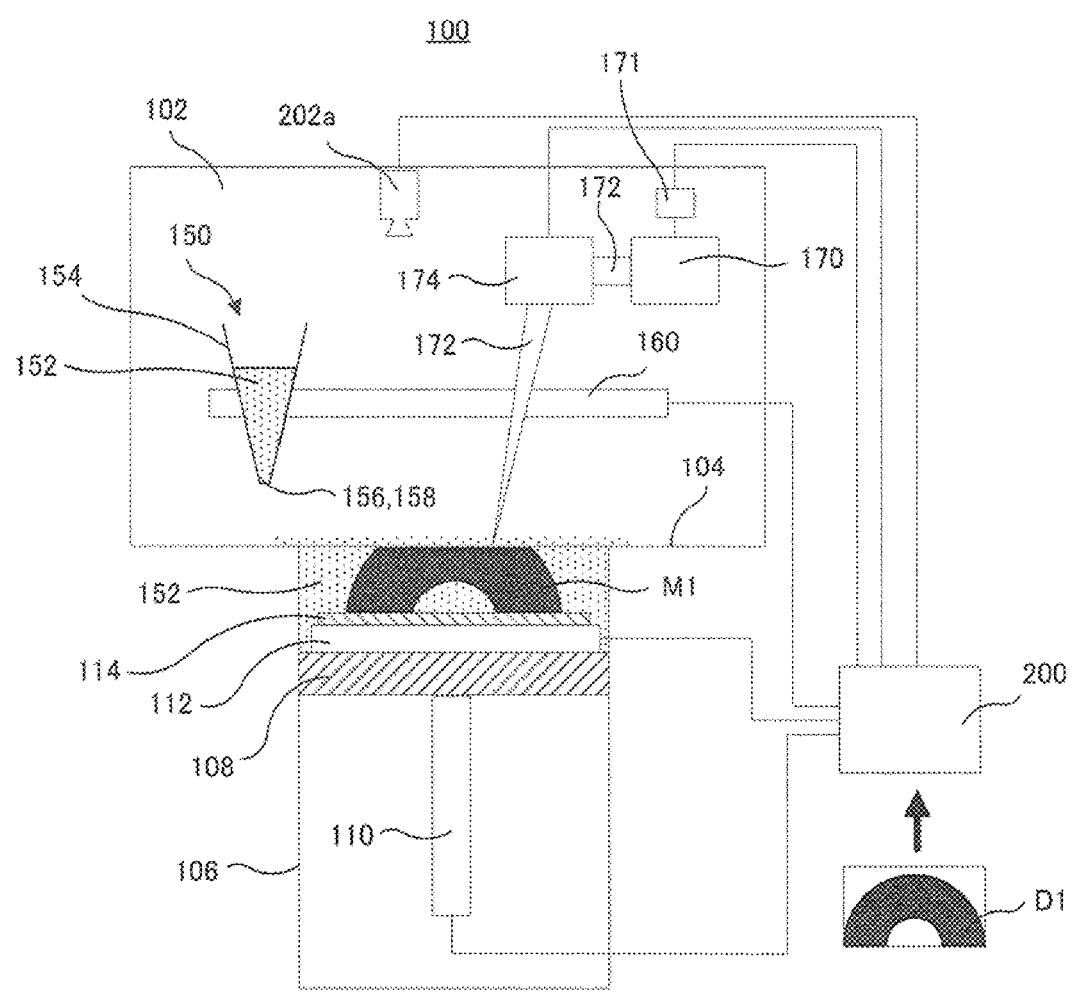
FIG. 1 schematically illustrates an AM apparatus for manufacturing a fabricated object according to one embodiment.

In the following description, embodiments of an AM apparatus for manufacturing a fabricated object according to the present invention will be described with reference to the attached drawings. In the attached drawings, identical or similar components may be indicated by identical or similar reference numerals, and redundant descriptions regarding the identical or similar components may be omitted in the description of each of the embodiments. Further, features described in each of the embodiments are applicable even to other embodiments in so far as they do not contradict each other.

FIG. 1 schematically illustrates an AM apparatus for manufacturing a fabricated object according to one embodiment. As illustrated in FIG. 1, an AM apparatus 100 includes a process chamber 102. A buildup chamber 106 is attached to a bottom surface 104 of the process chamber 102. A lift table 108 is installed in the buildup chamber 106. The lift table 108 is movable in the vertical direction (a z direction) by a driving mechanism 110. For example, the driving mechanism 110 may be a pneumatic or hydraulic driving mechanism or may be a driving mechanism including a motor and a ball screw. An inlet and an outlet for introducing and discharging protective gas into and out of the process chamber 102 may be provided, although they are not illustrated.

In one embodiment, an XY stage 112 is disposed on the lift table 108 as illustrated in FIG. 1. The XY stage 112 is a stage movable in two directions (an x direction and a y direction) in parallel with the plane of the lift table 108. A base plate 114 for supporting a material of a fabricated object is disposed on the XY stage 112.

A material supply mechanism 150 for supplying the material of the fabricated object is disposed above the buildup chamber 106 in the process chamber 102. The material supply mechanism 150 includes powder 152 used as the material of the fabricated object, a storage container 154 for holding, for example, metal powder, and a movement mechanism 160 for moving the storage container 154. The storage container 154 includes an opening 156 for discharging the material powder 152 onto the base plate 114. The opening 156 can be, for example, a linear opening 156 longer than one side of the base plate 114. In this case, the material powder 152 can be supplied to the entire surface of the base plate 114 by configuring the movement mechanism 160 so as to move in a range longer than the other side of the base plate 114 in a direction perpendicular to the line of the opening 156. Further, the storage container 154 includes a valve 158 for controlling the opening/closing of the opening 156.

In one embodiment, the AM apparatus 100 includes a laser light source 170, and a scanning mechanism 174, which guides a laser 172 emitted from the laser light source 170 toward the material powder 152 on the base plate 114, as illustrated in FIG. 1. In the illustrated embodiment, the laser light source 170 and the scanning mechanism 174 are disposed in the process chamber 102. The scanning mechanism 174 can be formed by an arbitrary optical system, and is configured to be able to irradiate an arbitrary position of a fabrication surface (a focus surface) on the base plate 114 with the laser 172.

In one embodiment, an electron beam source may be used instead of the laser light source 170. In the case where the electron beam source is used, the scanning mechanism 174 includes a magnet or the like, and is configured to be able to irradiate an arbitrary position of the fabrication surface on the base plate 114 with an electron beam.

In the embodiment illustrated in FIG. 1, the AM apparatus 100 includes a control device 200. The control device 200 is configured to control the operations of various kinds of operation mechanisms of the AM apparatus 100, such as the above-described driving mechanism 110, movement mechanism 160, laser light source 170, scanning mechanism 174, and valve 158 of the opening 156. The control device 200 can be formed by a general computer or a dedicated computer.

When a three-dimensional object is manufactured by the AM apparatus 100 according to the embodiment illustrated in FIG. 1, the procedure therefor is generally as follows. First, three-dimensional data D1 of a fabrication target is input to the control device 200. The control device 200 generates slice data for the fabrication based on the input three-dimensional data D1 of the fabricated object. Further, the control device 200 generates execution data including fabrication conditions and a recipe. In other words, the control device 200 functions as a computer that determines an irradiation position of the beam based on the three-dimensional data D1 of the fabricated object. The fabrication conditions and the recipe include, for example, beam conditions, beam scanning conditions, and layering conditions. The beam conditions include voltage conditions, a laser output, and the like of the laser light source 170 in the case where the laser is used, or include a beam voltage, a beam current, and the like in the case where the electron beam is used. The beam scanning conditions include a scanning pattern, a scanning route, a scanning speed, a scanning interval, and the like. Examples of the scanning pattern include a pattern when the beam scans in one direction, a pattern when the beam scans in reciprocating directions, a pattern when the beam scans zigzag, and a pattern when the beam moves transversely while drawing a small circle. The scanning route determines, for example, in what order the beam scans. The layering conditions include, for example, a material type, an average diameter of the powder material, a particle shape, a particle size distribution, a layering thickness (a thickness in which the material powder is deposited all over the surface at the time of the fabrication), and a fabrication thickness coefficient (a ratio between the layering thickness and the thickness of the actually manufactured fabricated object). A part of the above-described fabrication conditions and recipe may be generated and changed according to the input three-dimensional data of the fabricated object or may be determined in advance independently of the input three-dimensional data of the fabricated object.

The powder 152 used as the material of the fabricated object, such as metal powder, is loaded into the storage container 154. The lift table 108 of the buildup chamber 106 is moved to an upper position, by which the surface of the base plate 114 is adjusted so as to be positioned on the focus surface of the laser 172. Next, the valve 158 of the opening 156 of the storage container 154 is opened and the storage container 154 is moved, and then the material powder 152 is evenly supplied onto the base plate 114. The material supply mechanism 150 is controlled by the control device 200 so as to supply the material powder 152 onto the focus surface by an amount corresponding to one layer of the fabricated object (corresponding to the above-described "layering thickness"). Next, a fabricated object M1 corresponding to one layer is created by emitting the laser 172 from the laser light source 170, irradiating a predetermined range of the focus surface with the laser 172 by the scanning mechanism 174, and melting and sintering the powder material at a predetermined position. At this time, the irradiation position of the laser 172 may be changed by moving the XY stage 112 disposed on the lift table 108 if necessary.

After the fabrication corresponding to one layer is ended, the lift table 108 of the buildup chamber 106 is lowered by a distance corresponding to one layer. The material powder 152 is supplied onto the focus surface by the material supply mechanism 150 by an amount corresponding to one layer of the fabricated object again. Then, the fabricated object M1 corresponding to one layer is created by causing the laser 172 to scan on the focus surface by the scanning mechanism 174 and melting and sintering the material powder 152 at a predetermined position. The targeted fabricated object M1 can be created from the powder 152 by repeating these operations.

Figure 2:
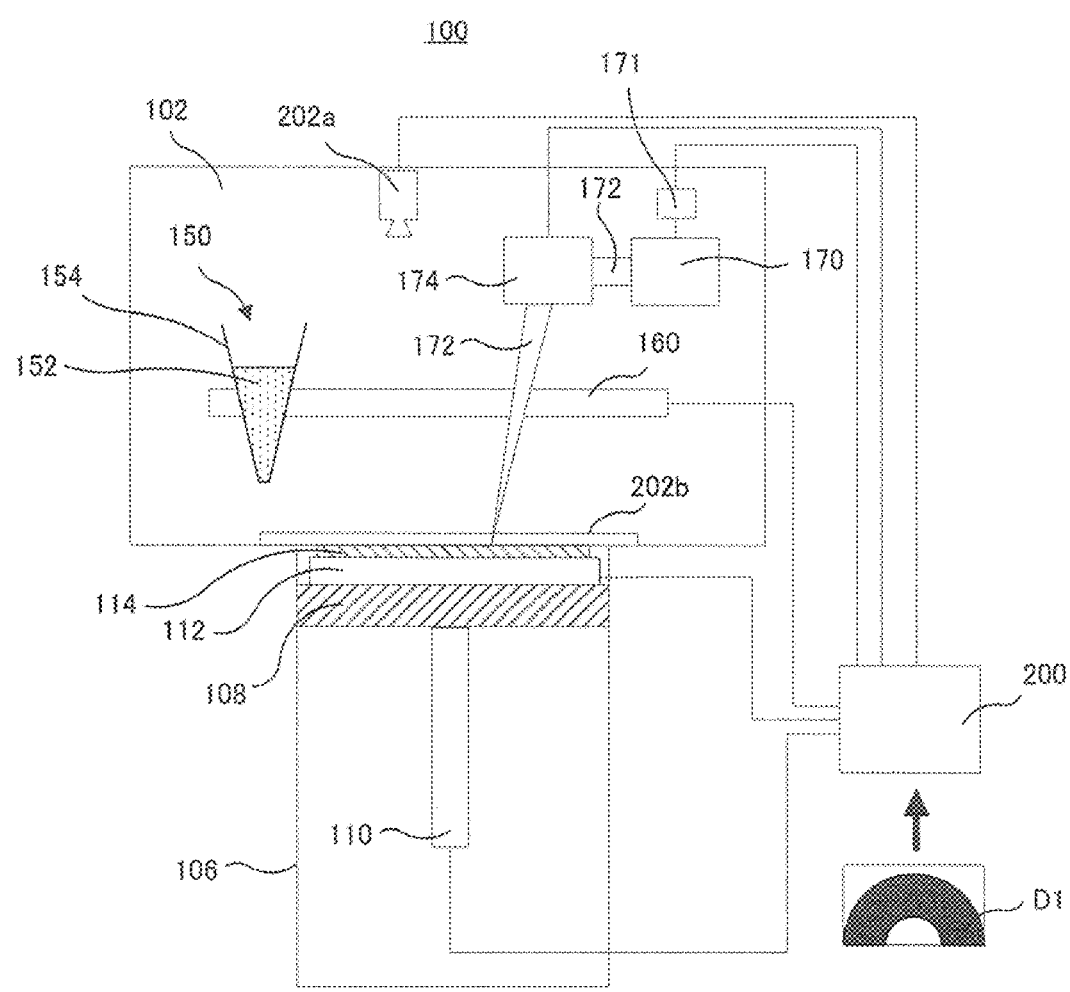
FIG. 2 schematically illustrates the AM apparatus performing an air AM process according to one embodiment.

As described above, if the AM apparatus malfunctions in the process of actually manufacturing the fabricated object M1 or an error is contained in the generated execution data, this may lead to a failure to yield the fabricated object as intended or a stop of the AM apparatus in the middle of the fabrication. Therefore, the AM apparatus 100 according to one embodiment of the present disclosure includes a configuration for testing whether the AM apparatus 100 operates so as to be able to actually manufacture the fabricated object. In the present specification, the process for testing the operation of the AM apparatus will be referred to as an "air additive manufacturing process". FIG. 2 schematically illustrates the AM apparatus performing the air AM process according to one embodiment. The air AM process is performed without the presence of the material powder 152.

The AM apparatus 100 according to one embodiment includes a detector 202 for detecting the irradiation position of the applied beam. In the embodiment illustrated in FIG. 1, the detector 202 is a camera 202a. The camera 202a is disposed in the process chamber 102, and is arranged so as to be able to image the entire scanning range on the focus surface of the laser 172. Further, the camera 202a is assumed to be a camera that can image the focus position of the laser 172. The camera 202a is connected to the control device 200, and data imaged by the camera 202a can be processed by the control device 200.

The AM apparatus 100 according to the present embodiment can confirm the actual operation of the AM apparatus, especially, the irradiation position and the scanning track of the laser by imaging the irradiation position of the laser 172 with use of the camera 202a. Whether the AM apparatus operates so as to be able to appropriately manufacture the input fabricated object can be confirmed by checking the irradiation position and the scanning track of the laser 172 in all layers of the input fabricated object. This operation can be performed without the presence of the material powder 152, thereby allowing the operation of the AM apparatus 100 to be confirmed before the fabrication is actually carried out with use of the material powder 152.

In one embodiment, the AM apparatus 100 can include a sheet-shaped two-dimensional detector 202b (refer to FIG. 2) as the detector 202 for detecting the irradiation position of the applied beam. The detector 202b is assumed to be able to detect the light of the laser 172, and can be sized so as to cover the entire scanning range on the focus surface of the laser 172. The irradiation position and the scanning track of the laser 172 can be confirmed similarly to the above-described camera 202a by setting up the sheet-shaped detector 202b on the focus surface of the laser 172.

In the case where the AM apparatus is configured to use the electron beam instead of the laser 172, the camera 202a is assumed to be able to image the electron beam or the sheet-shaped detector 202b is assumed to be able to detect the electron beam.

When the air AM process is performed, the intensity of the laser 172 or the electron beam is desirably set to a beam intensity lower than when the material powder 152 is sintered actually. In one embodiment, the AM apparatus 100 includes an adjustment device 171 for adjusting the intensity of the beam to be applied. This adjustment device 171 can be configured to adjust the power of electricity to be supplied to the laser light source or the electron beam source.

Figure 3:
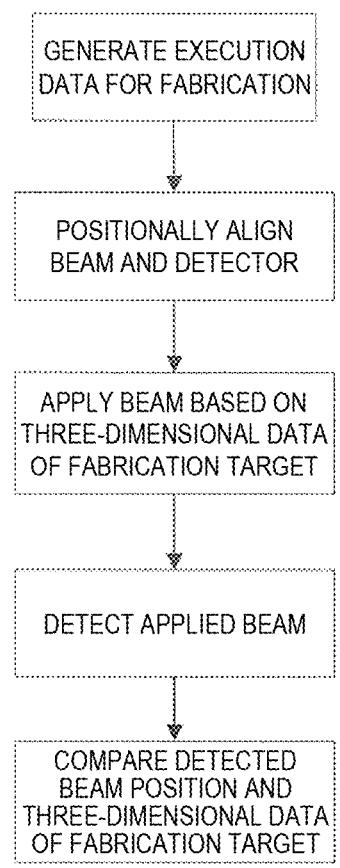
FIG. 3 is a flowchart illustrating a procedure for performing the air AM process according to one embodiment.

FIG. 3 is a flowchart illustrating a procedure for performing the air AM process according to one embodiment. First, the execution data for carrying out the fabrication by the AM apparatus 100 is generated based on the three-dimensional data D1 of the fabrication target input to the control device 200. The execution data includes, for example, the irradiation position of the beam, the fabrication conditions, and the recipe for each layer when the AM apparatus 100 fabricates the fabricated object.

Next, a reference position of the beam to be applied and a reference position of the detector 202, which detects the irradiation position of the beam, are aligned with each other.

Figure 4:
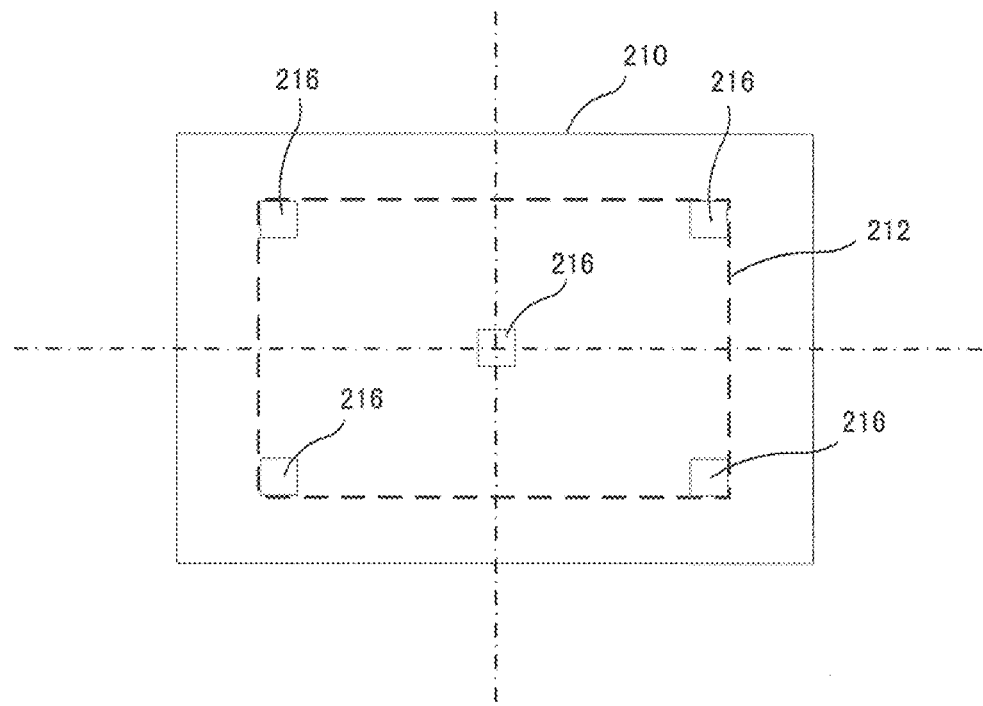
FIG. 4 is a schematic view illustrating how positional alignment is established between a beam and a detector and illustrates the detection range of the detector and the scanning range of the beam according to one embodiment.

FIG. 4 is a schematic view illustrating how positional alignment is established between the beam and the detector 202, and illustrates the detection range of the detector 202 and the scanning range of the beam. In FIG. 4, a rectangle indicated by an outer solid line represents a detection range 210 of the detector 202, in particular, the imaging region of camera 202a or the detection range of the sheet-shaped detector 202b. In FIG. 4, a broken line indicates a scanning range 212 of the beam, which is a range where the beam can scan by the scanning mechanism 174. A long dashed short dashed line in FIG. 4 indicates the center of the detection range of the detector 202.

To positionally align the reference position of the beam and the reference position of the detector 202, first, the detector 202 is disposed in such a manner that the entire scanning range 212 of the beam is contained in the detection range 210 of the detector 202. Next, a reference mark 216 is placed at an arbitrary position inside the scanning range 212 of the beam. In the example illustrated in FIG. 4, reference marks 216 are placed at the four corners of the scanning range 212 of the beam, one for each of the four corners. The reference mark may be one reference mark. The reference mark 216 may be placed at the center of the scanning range 212 of the beam. The reference mark 216 may be a feature preset on the focus surface of the AM apparatus 100, such as the surface of the base plate 114.

Next, the position of the reference mark 216 is irradiated with the beam, and the beam with which the reference mark 216 is irradiated is detected by the detector 202. This reveals the beam position detected by the detector 202 (the position of the reference mark 216 on the detector 202) and the position irradiated with the beam by the AM apparatus 100, such as the operation position of the scanning mechanism 174 (the operation position of the scanning mechanism 174 for irradiating the position of the reference mark 216 with the beam), thereby making it possible to confirm which position an arbitrary beam position detected by the detector 202 corresponds to on the focus surface of the AM apparatus.

After the positional alignment can be established between the beam and the detector 202, the beam is applied based on the execution data with use of the AM apparatus 100. However, the intensity of the laser 172 or the electron beam to be applied is set to a beam intensity lower than when the material powder 152 is sintered actually. Further, in the air AM process, the XY stage 112 is also put into operation based on the execution data for the fabrication, but the height of the lift table 108 is not changed. The position irradiated with the beam is detected by the detector 202. The beam position detected in the air AM process and the three-dimensional data of the fabrication target are compared and evaluated. The control device 200 can make the comparison and the evaluation between the beam position detected in the air AM process and the three-dimensional data D1 of the fabrication target. In other words, the control device 200 functions as an evaluator for comparing and evaluating the beam position detected in the air AM process and the three-dimensional data D1 of the fabrication target. If the detected beam position does not match the three-dimensional data of the fabrication target, it is considered that there is an error in the execution data or the operation of the AM apparatus, in particular, the operation of the scanning mechanism 174. If the detected beam position does not match the three-dimensional data of the fabrication target and the AM apparatus 100 operates according to the recipe in the execution data, it is considered that there is an error in the execution data. Further, supplementarily, the execution data may be tested by virtually conducting a fabrication simulation without using the AM apparatus based on the execution data in a virtual space on a computer. Even when the detected beam position matches the three-dimensional data of the fabrication target in the air AM process, it is considered that there is an error in the AM apparatus and/or the execution data if the AM apparatus 100 does not operate as intended or the same position is excessively redundantly irradiated.

Figure 5:
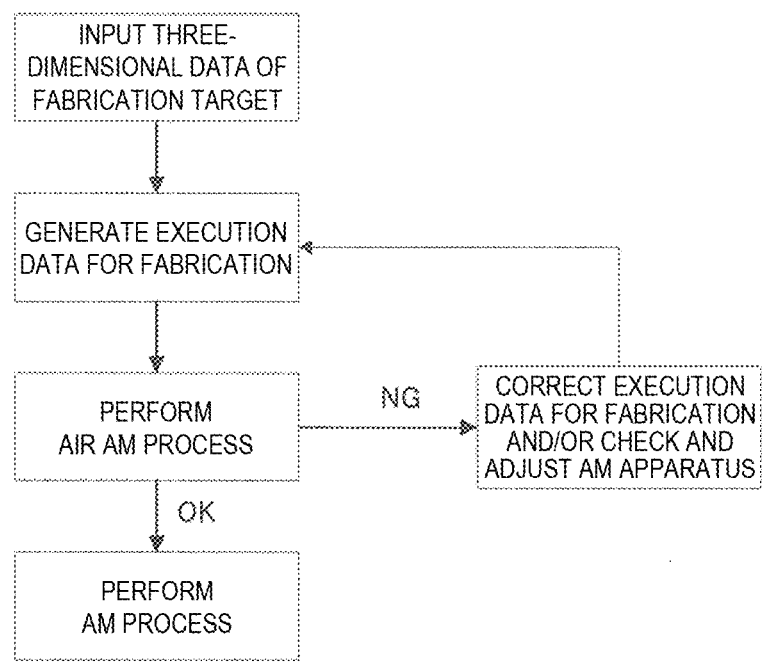
FIG. 5 is a flowchart illustrating an AM process using the AM apparatus according to one embodiment.

FIG. 5 is a flowchart illustrating an AM process using the AM apparatus according to one embodiment. First, the three-dimensional data of the fabrication target is input to the control device 200. The control device 200 generates the execution data including the fabrication conditions and the recipe. Next, the AM apparatus performs the above-described air AM process. If no fault is discovered in the air AM process, the fabricated object is manufactured by performing the actual AM process. If a fault is discovered in the air AM process, the air AM process is performed again after the fault is corrected.

The AM apparatus according to the above-described embodiment allows the air AM process to be performed with use of the same AM apparatus before the fabrication target is actually fabricated by the AM apparatus, thereby allowing an erroneous operation of the AM apparatus and/or a defect in the data for the fabrication to be discovered before the manufacturing. Therefore, the operation of the AM apparatus, the fabrication data, and the recipe can be tested without consuming the material for the fabrication. For example, the operations of the driving mechanism 110, which drives the lift table 108 of the AM apparatus 100, the XY stage 112 on the base plate 114, and the scanning mechanism 174 cannot be tested without the AM apparatus 100 actually put into operation, and therefore the virtual simulation on the computer is not sufficient to discover a malfunction in these driving mechanisms of the AM apparatus 100. The air AM process in the embodiment according to the present disclosure can test not only the execution data but also the operation mechanisms of the AM apparatus.

Having described the embodiments of the present invention based on the several examples, the above-described embodiments of the present invention are intended to only facilitate the understanding of the invention, and are not intended to limit the present invention thereto. It is apparent that the present invention can be modified or improved without departing from the spirit thereof, and includes equivalents thereof. Further, each of the components described in the claims and the specification can be arbitrarily combined or omitted within a range that allows it to remain capable of achieving at least a part of the above-described objects or bringing about at least a part of the above-described advantageous effects.

At least the following technical ideas can be recognized from the above-described embodiments. [Configuration 1]According to a configuration 1, an AM apparatus configured to manufacture a fabricated object is provided. This AM apparatus includes a chamber defining a space used to manufacture the fabricated object, a base plate disposed in the chamber and configured to support a material of the fabricated object, a beam source configured to irradiate the material on the base plate with a beam, a computer configured to determine an irradiation position of the beam based on three-dimensional data of the fabricated object, a scanning mechanism configured to move the beam according to the determined irradiation position, a detector configured to detect an irradiation position of the beam applied into the chamber, and an evaluator configured to compare the determined irradiation position and the detected irradiation position.

[Configuration 2] According to a configuration 2, the AM apparatus according to the configuration 1 further includes an adjustment device configured to adjust an intensity of the beam to be applied.

[Configuration 3]According to a configuration 3, in the AM apparatus according to the configuration 1 or the configuration 2, the beam source is a laser source.

[Configuration 4] According to a configuration 4, a method for testing an irradiation position of a beam in an AM apparatus is provided. This method includes a step of preparing three-dimensional data of a fabricated object to be manufactured by the AM apparatus, a step of determining the irradiation position of the beam based on the three-dimensional data, a step of applying the beam by putting the AM apparatus into operation according to the determined irradiation position of the beam without the presence of a material of the fabricated object, a step of detecting a position of the applied beam, and a step of comparing the determined irradiation position of the beam and the detected position of the beam.

[Configuration 5] According to a configuration 5, in the method according to the configuration 4, the step of applying the beam is performed with a beam intensity lower than a beam intensity when the beam is applied at the time of manufacturing the fabricated object by the AM apparatus.

[Configuration 6] According to a configuration 6, in the method according to the configuration 4 or the configuration 5, the beam is a laser.

REFERENCE SIGNS LIST 102 process chamber
106 buildup chamber
108 lift table
110 driving mechanism
112 stage
114 base plate
150 material supply mechanism
152 material powder
154 storage container
160 movement mechanism
170 laser light source
171 adjustment device
172 laser
174 scanning mechanism
200 control device
202 detector
D1 three-dimensional data
M1 fabricated object

What is claimed is:

1. An Additive Manufacturing (AM) apparatus configured to manufacture a fabricated object, the AM apparatus comprising:
a chamber defining a space used to manufacture the fabricated object;
a base plate disposed in the chamber and configured to support a material of the fabricated object;
a beam source configured to irradiate the material on the base plate with a beam;
a computer configured to determine an irradiation position of the beam based on three-dimensional data of the fabricated object;
a scanning mechanism configured to move the beam according to the determined irradiation position;

a detector configured to detect an irradiation position of the beam applied into the chamber; and an evaluator configured to compare the determined irradiation position and the detected irradiation position, wherein the computer is configured to:

prepare the three-dimensional data of the fabricated object to be manufactured;

determine the irradiation position of the beam based on the prepared three-dimensional data;

apply the beam by putting the AM apparatus into operation according to the determined irradiation position of the beam without the presence of the material of the fabricated object;

detect a position of the applied beam; and compare the determined irradiation position of the beam and the detected position of the beam.

2. The AM apparatus according to claim 1, further comprising an adjustment device configured to adjust an intensity of the beam to be applied.

3. The AM apparatus according to claim 1, wherein the beam source is a laser source.

* * * * *